United States Patent [19]
Yamada et al.

[11] Patent Number: 5,337,377
[45] Date of Patent: Aug. 9, 1994

[54] OPTICAL FIBER TERMINATION DEVICE

[75] Inventors: Kunio Yamada; Shuichi Takashi, both of Matsudo, Japan

[73] Assignee: Seikoh Giken Co., Ltd., Matsudo, Japan

[21] Appl. No.: 44,044

[22] Filed: Apr. 8, 1993

[30] Foreign Application Priority Data

Dec. 15, 1992 [JP] Japan .................. 4-354538

[51] Int. Cl.$^5$ .................................. G02B 6/26
[52] U.S. Cl. ............................ 385/15; 385/31; 385/96; 385/99
[58] Field of Search ............ 385/31, 34, 67, 84, 385/85, 88, 92, 93, 96, 99, 15

[56] References Cited

U.S. PATENT DOCUMENTS

| | | | |
|---|---|---|---|
| 4,239,333 | 12/1980 | Dakss et al. | 385/67 |
| 4,381,882 | 5/1983 | Sabine | 385/31 |
| 4,738,508 | 4/1988 | Plamquist | 385/84 |
| 4,856,865 | 8/1989 | Lee | 385/67 |
| 4,900,114 | 2/1990 | Mortimore et al. | 385/96 |
| 4,955,014 | 9/1990 | Kuppers et al. | 370/3 |
| 5,095,519 | 3/1992 | Dorsey | 385/140 |
| 5,222,172 | 6/1993 | Suzuki | 385/96 |

*Primary Examiner*—Frank Gonzalez
*Attorney, Agent, or Firm*—Spencer, Frank & Schneider

[57] ABSTRACT

An optical fiber termination device wherein temperature rise is minimized when light power is high or a power laser is used therewith. A first optical fiber is connected to a second optical fiber by fusing the core of the first optical fiber to the clad of the second optical fiber with a discharge generated between electrodes. The first optical fiber is inserted into a hole at the center of a ferrule and then the first optical fiber is fastened to the ferrule by fusing them. Thereafter, the edge surface of the ferrule is finished by polishing it. The second optical fiber is covered with a protective cover. Light coming from the core of the first optical fiber is incident on and scattered into the clad of the optical fiber. The light reflected toward the light source is greatly decreased by this structure.

10 Claims, 2 Drawing Sheets

OPTICAL FIBER TERMINATION DEVICE

BACKGROUND OF THE INVENTION

The present invention relates to an optical fiber termination device used in an optical fiber communication circuit, and especially to an optical fiber termination device wherein a temperature rise is caused by high light power being terminated after passing through an optical fiber connected thereto.

If, in the prior art, one of a pair of optical fiber connector plugs used to optically connect optical fiber communication circuits together is detached from the other a light signal coming from a light source consisting of a laser device may reflect at the edge surface of the optical fiber built in the optical fiber connector plug to be connected to the light source, and the reflected light goes back to the light source. This type of reflection causes the laser diode to operate unstably since the reflected light is recombined with the light being generated in the light source.

The reflected light energy is remarkable, and is −12 dB with respect to incident light energy when the surface of the optical fiber at the edge thereof is orthogonal to the optical axis.

The optical fiber termination device is connected to the optical fiber edge in order to scatter the light going out of the optical fiber core so that the light signal might not reflect from the edge surface of the optical fiber.

FIGS. 5(a), 5(b) and 5(c) show cross-sectional views of an optical fiber termination device built in accordance with the technique in the prior art, as an example, which is to be used with the optical connector.

Optical fiber 22 is inserted into hole 23 at the center of optical connector ferrule 21 to be connected to the light source, and rear edge surface 24 of optical connector ferrule 21 is finished at right angle with respect to hole 23 by polishing optical fiber ferrule 21 and optical fiber 22 together.

Optical fiber termination device 25 consists of another ferrule and optical fiber 26 inserted into hole 28 at the center of that ferrule. The front edge surface of optical fiber termination device 25 is finished at right angle with respect to said hole 28 so that the front edge surface of optical fiber termination device 25 may contact the rear edge surface of optical connector ferrule 21. Rear edge surface 30 of said optical fiber termination device 25 is finished by polishing it at an angle greater than 8 degrees(or the threshold) with respect to a plane perpendicular to the optical axis of hole 28.

Consider that optical fibers 22 and 26 are inserted into alignment sleeve 31 after the rear edge surface of optical fiber ferrule 21 is contacted with front edge surface 29 of the other optical fiber ferrule. Light La is incident on core 32 of optical fiber 26 passing through core 35 of optical fiber 22 and is reflected from edge surface 30. The reflected light is scattered into clad 33 which surrounds core 32, as indicated by arrow Lb. This type of structure reduces the light energy reflecting from the rear edge surface of the optical fiber, and the light energy going into the light source can be reduced by −60 dB or more.

High light power is considered to be applied to the optical fiber termination device having such a structure as shown in FIGS. 5(a), 5(b) and 5(c) which are used to reduce the reflection of the light at the rear edge surface thereof where the light is to be terminated. The temperature of the optical fiber termination device rises around the rear edge surface thereof, at which the light energy can reflect, due to the scattering of the light into the clad layer. The temperature rise sometimes destroys the optical fiber termination device.

The objective of the present invention is therefore to provide the optical fiber termination device having a new type of structure which is free from temperature rise when used in high power light signal circuits.

SUMMARY OF THE INVENTION

The optical fiber termination device built in accordance with the present invention is constructed by fusing the rear edge surface(s) of the core(s) of first optical fiber(s) through which the light signal to be terminated can pass to the front edge surface(s) of the clad(s) of second optical fiber(s).

The optical fiber termination device can be of such a structure that first and second optical fibers are respectively arranged in line to form a ribbon consisting of a plurality of optical fibers, and that the termination is accomplished by fusing the rear edge surfaces of the cores of first optical fibers through which the light signals to be transmitted can pass to the front edge surfaces of the clads of second optical fibers.

The optical fiber termination device is of such a structure that first and second optical fibers are covered with a protective cover and that the inner surface of the protective cover can absorb or scatter the light reflected from the rear edge surface(s) of second optical fibers when the reflected light strikes said inner surface thereof.

The optical fiber termination device built in accordance with the present invention is free from local temperature rise since the light passing through the core(s) of first optical fiber(s) to be connected to the light source goes to the clad(s) of second optical fiber(s) to be terminated.

The optical fiber termination device built in accordance with the present invention is of such a structure that second optical fiber(s) made as a part of first optical fiber(s) to be connected to the light source is(are) easily fused to the first optical fiber(s) after the first optical fiber(s) is(are) cut to yield second optical fiber(s) and aligned to the second optical fiber(s).

BRIEF DESCRIPTION OF THE DRAWINGS

FIG. 4(a) is a cross-sectional view thereof and FIG. 4(b) a side view thereof.

FIG. 5(a) is a cross-sectional view of the device, and FIGS. 5(b) and 5(c) are cross-sectional views of the optical fiber.

DESCRIPTION OF THE PREFERRED EMBODIMENTS

Figure 1:
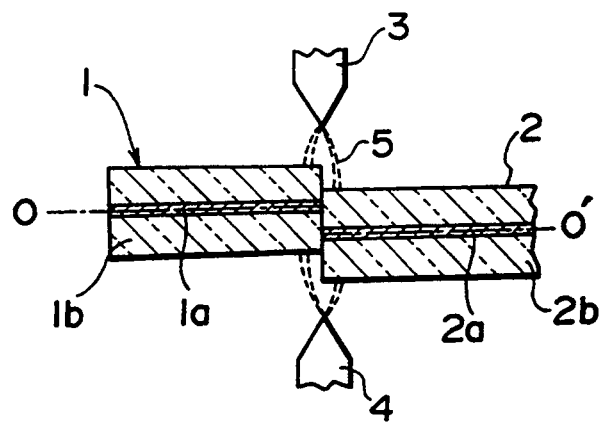
FIG. 1 shows a cross-sectional view for describing an optical fiber termination device built in accordance with the present invention, which indicates the procedure for fusing a pair of optical fibers together during fabrication of the optical fiber termination device.

The present invention will be described in detail referring to the drawings.

FIG. 1 shows a cross-sectional view of an optical fiber termination device built in accordance with the present invention, which indicates the procedure for fusing a pair of optical fibers together during fabrication of the optical fiber termination device.

Referring to FIG. 1, a first optical fiber 1 is faced to a second optical fiber 2 with axis O of core 1a and axis O' of core 2a off-centered so that core 1a of first optical fiber 1 is attached to clad 2b of second optical fiber 2 and clad 1b is attached to core 2a. The junction between first optical fiber 1 and second optical fiber 2 is fused by an arc discharge 5 generated across electrodes 3 and 4. A heater can be used in place of the arc discharge if desired.

Figure 2:
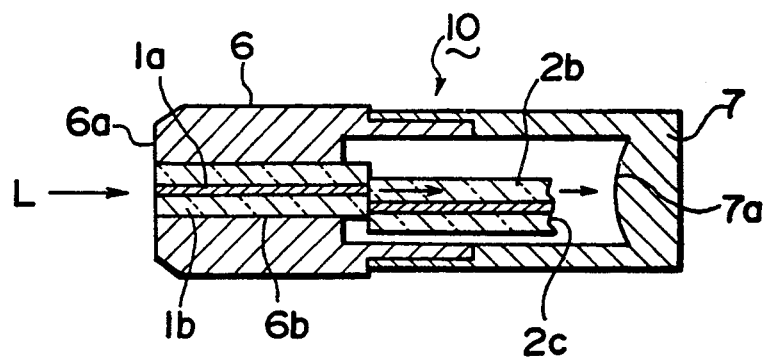
FIG. 2 shows a cross-sectional view of a first embodiment of an optical fiber termination device wherein a pair of optical fibers are connected together by fusing them.

FIG. 2 shows a cross-sectional view of a first embodiment of the optical fiber termination device wherein a pair of optical fibers are connected together by fusing form a fusion splice in accordance with the method described above.

Referring to FIG. 2, first optical fiber 1 is inserted into hole 6b of ferrule 6 at the center thereof and is fastened therein by an adhesive agent. Front edge surface 6a of ferrule 6 is finished by polishing it.

No special work is needed to finish the rear edge surface of second optical fiber 2, wherefrom the light coming from clad 2b can scatter. The rear edge surface of second optical fiber 2 should remain rough without any work other than the cutting thereof.

Second optical fiber 2 is covered with a protective cover 7, and protective cover 7 having a cavity therein is preferably made by molding a plastic material to form such a structure that it can absorb the light coming from second optical fiber 2.

Inner bottom surface 7a of protective cover 7 curves outward or inclines with respect to optical axis O' so that the light reflecting from said inner bottom surface 7a does not strike rear edge surface 2c of clad 2b.

This type of structure reduces the energy density of the light going into clad 2b from core 1a to −20 dB or so. That is, light L coming from the light source passes through core 1a of first optical fiber 1 and is straightly incident on clad 2b of second optical fiber 2. The light incident on clad 2b scatters into clad 2b. The scattering of the light into clad 2b of second optical fiber 2 reduces the power density of the light in clad 2b. The light power goes out of clad 2b of second optical fiber 2 into the area enclosed by protective cover 7, and little light power can return to the light source.

The light power returning to the light source due to the reflection was less than −60 dB in the embodiment shown in FIG. 2. The temperature rise within the optical fiber termination device due to light power absorption was lower than the minimum threshold of the detector.

Figure 3:
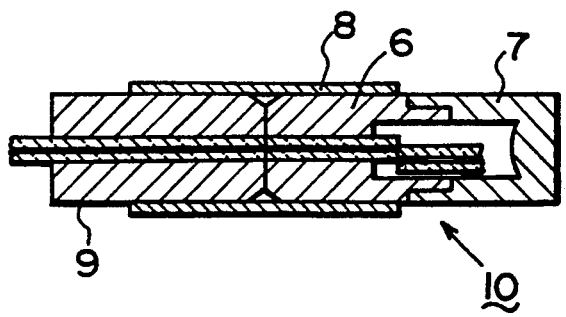
FIG. 3 shows a cross-sectional view showing the use of the above-mentioned optical fiber termination device built in accordance with the present invention wherein the optical connector ferrule to be connected to the light source is used to align optical fibers.

FIG. 3 shows a cross-sectional view of the optical fiber termination device built in accordance with the present invention wherein optical connector ferrule 9 to be connected to the light source is used to align optical fibers. Optical connector ferrule 9 is inserted into alignment sleeve 8 moving from the left to right, and optical fiber termination device 10 built in accordance with the present invention is inserted into alignment sleeve 8 from the other side.

Figures 4A, 4B:
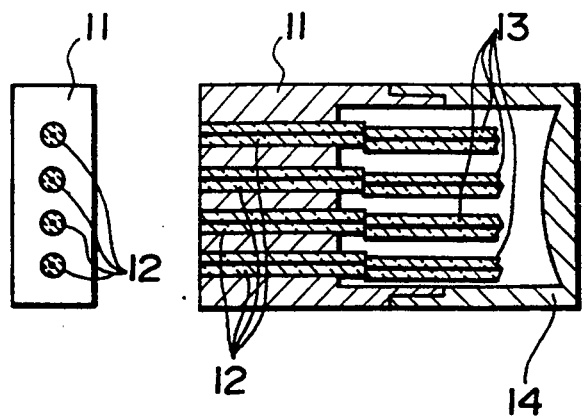
FIGS. 4(a) and 4(b) show another embodiment of the optical fiber termination device built in accordance with the present invention wherein a plurality of first and second optical fibers are arranged in line and connected together to form a pair of ribbons, each consisting of the first or second optical fibers.
Figures 5A, 5B, 5C:
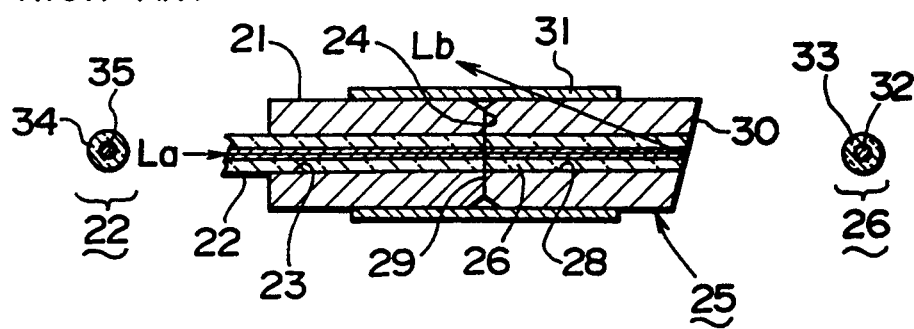
FIGS. 5(a), 5(b) and 5(c) show cross-sectional views of a prior art optical fiber termination device used together with an optical connector.

FIGS. 4(a) and 4(b) show another embodiment of the optical fiber termination device built in accordance with the present invention wherein a plurality of first and second optical fibers are arranged in line and connected together to form a pair of ribbons, each consisting of the first or second optical fiber.

A plurality of optical fibers are fused in accordance with the procedure shown in FIG. 1. and they are inserted into the respective holes of ferrule 11 so as to form a ribbon of optical fibers. They are then covered with protective cover 14.

In FIGS. 4(a), 4(b), the optical fiber termination device consisting of four optical fibers is shown. First optical fiber array 12 consists of four optical fibers and second optical fiber array 13 of another four optical fibers.

As described above, the optical fiber termination device built in accordance with the present invention is constructed by coaxially aligning and fusing the core(s) of first optical fiber(s) to be connected to the light source to the clad(s) of second optical fiber(s) to be terminated so that the light power passing through the core(s) of the first optical fiber(s) can enter and straightly be diffused into the clad(s) of the second optical fiber(s). The light power within the clad(s) of the second optical fiber(s) is much lower than that within the core(s) of the first optical fiber(s) since the dimensions of the clad(s) are much greater than those of the core(s). This type of optical fiber termination device is free from internal temperature rise, and the reflection losses are much less than those of the optical fiber termination device built in accordance with the prior art technique The optical fiber termination device built in accordance with the present invention can be constructed by a fusing method employing an arc discharge which is a simple process not requiring the polishing of the surface edges of the ferrule. The optical fiber termination device can thus be constructed with reduced cost, and the fabrication process is simpler than the conventional process. The technique of fusing a ribbon consisting of a plurality of optical fibers to another ribbon consisting of another plurality of optical fibers at a time has been established elsewhere, and the optical fiber termination device built in accordance with the present invention can also be constructed with reduced cost. The fabrication process in this case is also simpler than the conventional process.

The fabrication process of the optical fiber termination device built in accordance with the present invention can be applied to construct an optical division and multiplication device, an optical switch and many other devices.

What is claimed is:

1. An optical fiber termination device, comprising
a first optical fiber for receiving light from a light source, said first optical fiber having a first core extending along a first optical axis and a first clad surrounding said first core;
a second optical fiber for receiving light from said first optical fiber, said second optical fiber having a second core extending along a second optical axis offset from said first optical axis and a second clad surrounding said second core, an end portion of the first core of said first optical fiber being fused to an end portion of the second clad of said second optical fiber and an end portion of the second core of said second optical fiber being fused to an end portion of the first clad of said first optical fiber to form a fusion splice; and a protective cover having a cavity therein surrounding said second optical fiber, said protective cover being made of light absorbing material for absorbing light emanating from said second optical fiber, whereby light power returned to the light source and a temperature rise within said termination device are minimized.

2. An optical fiber termination device as claimed in claim 1, wherein the cavity of said protective cover has a surface element, said surface element having a curvature such that light reflected therefrom does not impinge on a rear edge surface of said second clad.

3. An optical fiber termination device as claimed in claim 2, wherein the surface element of said cavity projects toward said second optical fiber, and is substantially symmetrical with respect to said first optical axis.

4. An optical fiber termination device as claimed in claim 1, wherein the end portions of said first and second cores at said fusion splice are parallel to each other.

5. An optical fiber termination device as claimed in claim 1, which further comprises a ferrule surrounding said first optical fiber, said ferrule being connected to said protective cover.

6. An optical fiber termination device, comprising a first plurality of parallel optical fibers for receiving light from a light source, each of said first plurality of optical fibers having a first core extending along a first optical axis and a first clad surrounding said first core;

a second plurality of parallel optical fibers for receiving light from said first plurality of optical fibers, each of said second plurality of optical fibers having a second core extending along a second optical axis offset from a first optical axis of a corresponding one of said first optical fibers and a second clad surrounding said second core, an end portion of the first core of each of said first optical fibers being fused to the second clad of a corresponding one of said second optical fibers and an end portion of the second core of each of said second optical fibers being fused to an end portion of the first clad of a corresponding one of said first optical fibers to form a plurality of fusion splices; and a protective cover having a cavity therein surrounding said second plurality of optical fibers, said protective cover being made of light absorbing material for absorbing light emanating from said second plurality of optical fibers, whereby light power returned to the light source and a temperature rise within said termination device are minimized.

7. An optical fiber termination device as claimed in claim 6, wherein the cavity of said protective cover has a surface element, said surface element having a curvature such that light reflected therefrom does not impinge on a rear edge surface of a second clad.

8. An optical fiber termination device as claimed in claim 6, wherein the end portions of the first cores of said first plurality of optical fibers are parallel to the end portions of corresponding cores of said second plurality of optical fibers at said fusion splices.

9. An optical fiber termination device as claimed in claim 6, which further comprises a ferrule surrounding said first plurality of optical fibers, said ferrule being connected to said protective cover.

10. The method of terminating a first optical fiber, said optical fiber having core and clad portions, comprising the steps of fusing a clad portion of a second optical fiber to the core portion of said first optical fiber, and fusing a core portion of said second optical fiber to the clad portion of said first optical fiber to form a fusion splice; and surrounding said second optical fiber with a protective cover having a cavity therein, said protective cover being made of light absorbing material.

* * * * *